(12) United States Patent
Craft

(10) Patent No.: US 11,994,423 B2
(45) Date of Patent: May 28, 2024

(54) WEIGH BELT ASSEMBLY WITH A WEIGH AXIS THAT INTERSECTS A ROTATIONAL AXIS OF AN IDLER ROLLER

(71) Applicant: USC, LLC, Sabetha, KS (US)

(72) Inventor: Timothy A. Craft, Holton, KS (US)

(73) Assignee: Renovators, LLC, Sabetha, KS (US)

( * ) Notice: Subject to any disclaimer, the term of this patent is extended or adjusted under 35 U.S.C. 154(b) by 333 days.

(21) Appl. No.: 17/458,885

(22) Filed: Aug. 27, 2021

(65) Prior Publication Data

US 2022/0065678 A1 Mar. 3, 2022

Related U.S. Application Data

(60) Provisional application No. 63/071,677, filed on Aug. 28, 2020.

(51) Int. Cl.
  *G01F 9/00* (2006.01)
  *G01G 11/04* (2006.01)
  *G01G 11/18* (2006.01)

(52) U.S. Cl.
  CPC ............. *G01F 9/003* (2013.01); *G01G 11/04* (2013.01); *G01G 11/18* (2013.01)

(58) Field of Classification Search
  CPC .... G01G 11/00; G01G 11/003; G01G 19/415; G01G 21/22; G01G 11/04; G01G 11/18; G01F 9/003
  See application file for complete search history.

(56) References Cited

U.S. PATENT DOCUMENTS

| 3,603,416 A | * | 9/1971 | Spurlin | ................ | G01G 11/003 |
| | | | | | 177/16 |
| 3,718,197 A | * | 2/1973 | Barten et al. | .......... | G01G 11/02 |
| | | | | | 198/816 |

(Continued)

FOREIGN PATENT DOCUMENTS

| CN | 2819183 | 9/2006 |
| CN | 201859002 | 6/2011 |

(Continued)

*Primary Examiner* — Randy W Gibson
(74) *Attorney, Agent, or Firm* — Hovey Williams LLP

(57) ABSTRACT

A weigh belt assembly includes a weigh belt that has first and second spaced apart rollers and an endless belt trained around the rollers to present a belt run configured to support particulate material. The rollers each have a rotational axis. The assembly also includes a belt drive operably coupled with at least one of the rollers for rotation thereof in order to move the belt run in a direction toward the second roller. The assembly also includes apparatus for delivery of quantities of particulate material onto the moving belt run at a position between the first and second rollers. The assembly further comprises a pivot assembly including a shiftable component operably coupled with the weigh belt in order to permit pivoting and downward deflection of the weigh belt under the load of the particulate material deposited on the belt run. A device for measuring the load experienced by the weigh belt during the deflection thereof is provided. A method of determining the flow rate of a particulate material and/or the total weight of material delivered using a weigh belt is also disclosed.

19 Claims, 9 Drawing Sheets

(56) References Cited

U.S. PATENT DOCUMENTS

| | | | | |
|---|---|---|---|---|
| 3,924,729 | A | * 12/1975 | Flinth | G01G 11/04 177/16 |
| 4,463,816 | A | * 8/1984 | MacFarlane | G01G 11/04 177/255 |
| 4,475,669 | A | 10/1984 | Wahl | |
| 4,682,664 | A | * 7/1987 | Kemp | G01G 11/003 73/1.13 |
| 5,111,896 | A | * 5/1992 | Porcari | G01G 11/04 177/187 |
| 5,184,754 | A | 2/1993 | Hansen | |
| 5,285,019 | A | * 2/1994 | Kempf | G01G 3/1402 177/16 |
| 5,296,654 | A | * 3/1994 | Farley | G01G 11/003 177/121 |
| 5,338,901 | A | * 8/1994 | Dietrich | G01G 11/003 177/16 |
| 5,423,456 | A | 6/1995 | Arendonk et al. | |
| 5,747,747 | A | * 5/1998 | Cadou | G01G 11/04 177/187 |
| 6,066,809 | A | 5/2000 | Campbell et al. | |
| 7,622,686 | B2 | 11/2009 | Wolfschaffner | |
| 8,063,321 | B2 | * 11/2011 | Wineland | G01G 11/00 177/126 |
| 8,610,008 | B2 | 12/2013 | Futehally | |
| 8,735,745 | B2 | 5/2014 | Rossi | |
| 9,074,923 | B2 | * 7/2015 | Hyer | G01G 11/00 |
| 10,462,967 | B2 | 11/2019 | Brandmeier et al. | |
| 10,620,023 | B2 | 4/2020 | Brandmeier et al. | |
| 10,631,453 | B2 | 4/2020 | Bardi | |

FOREIGN PATENT DOCUMENTS

| | | |
|---|---|---|
| CN | 105668185 | 6/2016 |
| CN | 110834967 | 2/2020 |
| DE | 2519795 | 3/1975 |
| DE | 3933472 | 6/1989 |
| EP | 2399103 | 12/2011 |
| JP | 62217121 | 9/1987 |
| WO | 1991014927 | 10/1991 |
| WO | 2010065373 | 6/2010 |

* cited by examiner

WEIGH BELT ASSEMBLY WITH A WEIGH AXIS THAT INTERSECTS A ROTATIONAL AXIS OF AN IDLER ROLLER

BACKGROUND OF THE INVENTION

Cross Reference to Related Application

The present application claims priority from U.S. Provisional Application No. 63/071,677 filed Aug. 28, 2020, entitled WEIGH BELT ASSEMBLY, which is hereby incorporated in its entirety by reference herein

Field of the Invention

The present invention is concerned with weigh belt assemblies of simplified design which accurately measure the flow rate of particulate materials (e.g., agricultural seeds) delivered from a source thereof for downstream processing, and/or the total amount of particulate material delivered from the assembly. More particularly, the invention pertains to such weigh belt assemblies and methods wherein the particulate materials are deposited onto the weigh belt along an upright product-delivery axis, which substantially intersects a pivot axis for the weigh belt, and the weigh belt deflection is determined at the outlet end of the belt.

Description of the Prior Art

Conventional weigh belt assemblies typically weigh the entire length of a weigh belt, or use a weighted-roller or weigh bridge design. These units suffer from significant inaccuracies, up to as much as ten to fifteen percent (10-15%). There is accordingly a need in the art for improved weigh belt assemblies having better accuracies and more simple designs.

Prior art references describing conventional weigh belt assemblies include U.S. Pat. Nos. 4,475,669A, 5,423,456, 5,184,754, 6,066,809A, 7,622,686B2, 8,610,008B2, 8,735,745, 9,074,923B2, 10,462,967B2, 10,620,023B2, and 10,631,453B2; and foreign references Nos. CN105668185A, CN110834967A, CN201859002U, CN2819183Y, DE2519795A1, DE3933472A1, EP2399103B1, WO1991014927A1, and WO2010065373A1.

SUMMARY OF THE INVENTION

The present invention overcomes the problems outlined above (as well as other problems) and provides a weigh belt assembly having substantially enhanced flow rate accuracy, as compared with prior weigh belts.

According to a first aspect of the present invention, the weigh belt assembly comprises a weigh belt including first and second spaced apart rollers and an endless belt trained around the rollers to present a belt run configured to support particulate material. The rollers each have a rotational axis. The assembly includes a belt drive operably coupled with at least one of the rollers for rotation thereof in order to move the belt run in a direction toward the second roller. The assembly further includes apparatus for delivery of quantities of particulate material onto the moving belt run at a position between the first and second rollers. The assembly also comprises a pivot assembly including a shiftable component operably coupled with the weigh belt in order to permit pivoting and downward deflection of the weigh belt under the load of the particulate material deposited on the belt run. A device for measuring the load experienced by the weigh belt during the deflection thereof is also provided. The device presents a weigh axis which substantially intersects the rotational axis of the second roller.

A second aspect of the present invention contemplates a weigh belt assembly including a weigh belt. The weigh belt includes first and second spaced apart rollers and an endless belt trained around the rollers to present a belt run configured to support particulate material. The rollers each have a rotational axis. The assembly includes a belt drive operably coupled with at least one of the rollers for rotation thereof in order to move the belt run in a direction toward the second roller. The assembly further includes apparatus for delivery of quantities of particulate material onto the moving belt run at a position between the first and second rollers. The assembly also comprises a pivot assembly including a stationary component and a shiftable component. The stationary component is separate from said weigh belt. The shiftable component is operably coupled with the weigh belt and engages the stationary component in order to permit pivoting and downward deflection of the weigh belt relative to the stationary component under the load of the particulate material deposited on the belt run. A device for measuring the load experienced by the weigh belt during the deflection thereof is also provided.

A third aspect of the present invention involves a method of determining the flow rate of a particulate material and/or the total weight of material delivered using a weigh belt, wherein the weigh belt comprises first and second spaced apart rollers and an endless belt trained around the rollers. The rollers each have a substantially horizontal rotational axis. The method comprises the step of delivering the particulate material onto the belt along an upright product-delivery axis and between the first and second rollers. The method also comprises the step of causing the weigh belt to deflect downwardly about a pivot axis by virtue of the weight of the delivered particulate material. The pivot axis is defined by a pivot assembly. The pivot assembly includes a stationary component separate from the weigh belt. The pivot assembly also includes a shiftable component that is operably coupled with the weigh belt and engages the stationary component. The method also includes the steps of determining the load experienced by the weigh belt during the deflection thereof, and using the determined load to calculate the flow rate and/or the total weight of material delivered.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWINGS

Preferred embodiments of the present invention are described in detail below with reference to the attached drawing figures, wherein:

The drawing figures do not limit the present invention to the specific embodiments disclosed and described herein. While the drawings do not necessarily provide exact dimensions or tolerances for the illustrated components or structures, FIGS. 1-9 are to scale with respect to the relationships between the components of the structures illustrated therein.

DETAILED DESCRIPTION OF THE PREFERRED EMBODIMENT

Figure 1:
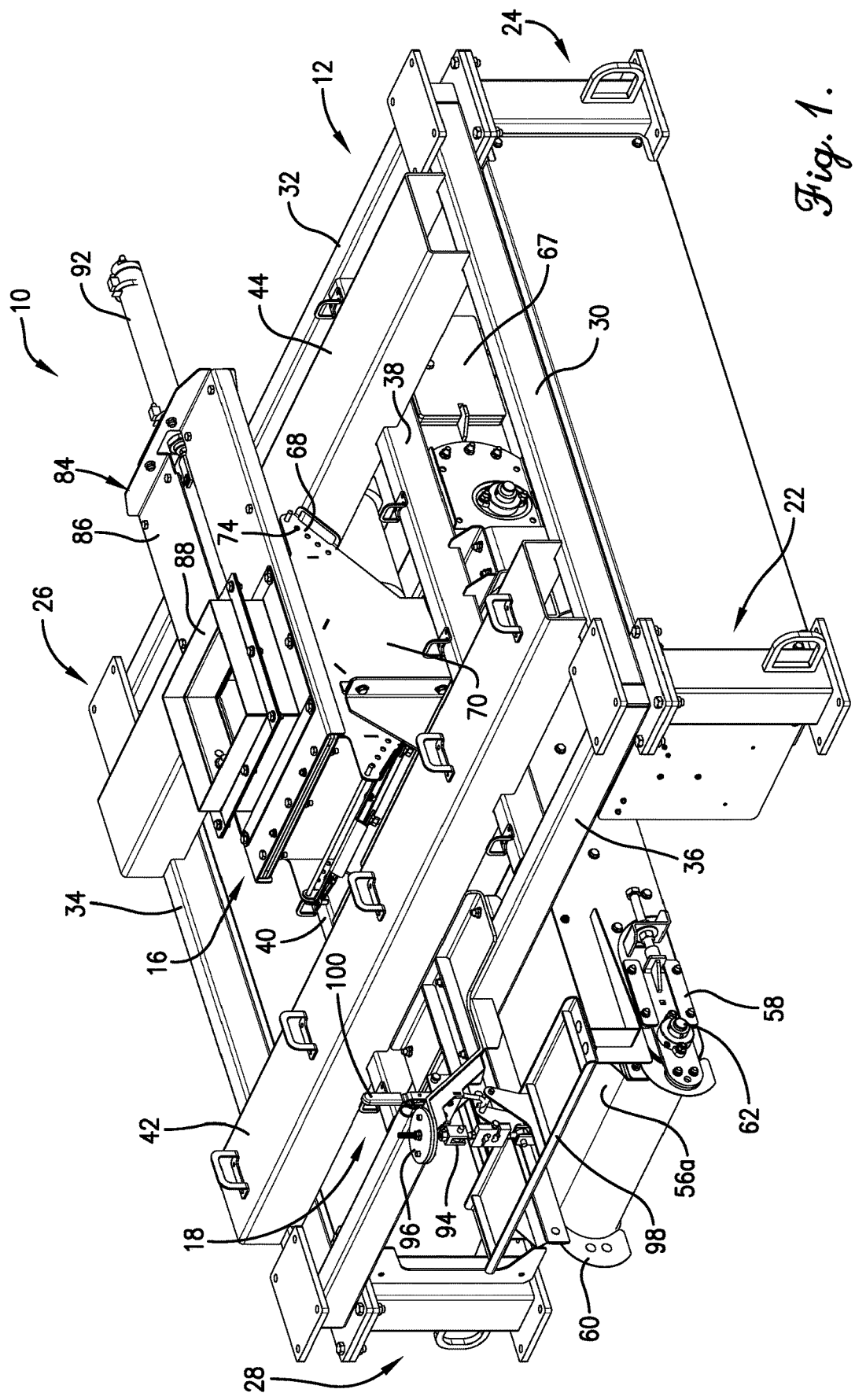
FIG. 1 is a top perspective view of a weigh belt assembly in accordance with the invention.

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Turning specifically to the drawings, the weigh belt assembly 10 broadly includes a stationary frame 12, a weigh belt 14 mounted on the frame 12, a product inlet unit 16, a weighing mechanism 18, and a pivot assembly 20. The assembly 10 is designed to receive particulate materials, such as seeds or the like, and to convey the seeds to a downstream processing station, while providing an accurate weighing of the amounts of particulate delivered to the processing station and/or the flow rate of the particulate material during delivery thereof.

The stationary frame 12 includes four upstanding corner columns 22, 24, 26, 28 with four interconnecting perimeter rails 30, 32, 34, 36, as well as two intermediate, fore-and-aft extending rails 38 and 40 attached to the perimeter rails 32 and 36. A pair of reinforcing channels 42, 44 extend between and are secured to the perimeter rails 30 and 34. Sidewalls 46, 48, 50 are respectively secured between the corner columns 22 and 24, 24 and 26, and 26 and 28. Alternative frame structures are within the ambit of certain aspects of the present invention. For example, according to certain aspects of the present invention, the frame may have an overall shape that is not generally orthogonal, be provided with less, more, or alternative components than shown, be eliminated entirely, etc.

Figure 4:
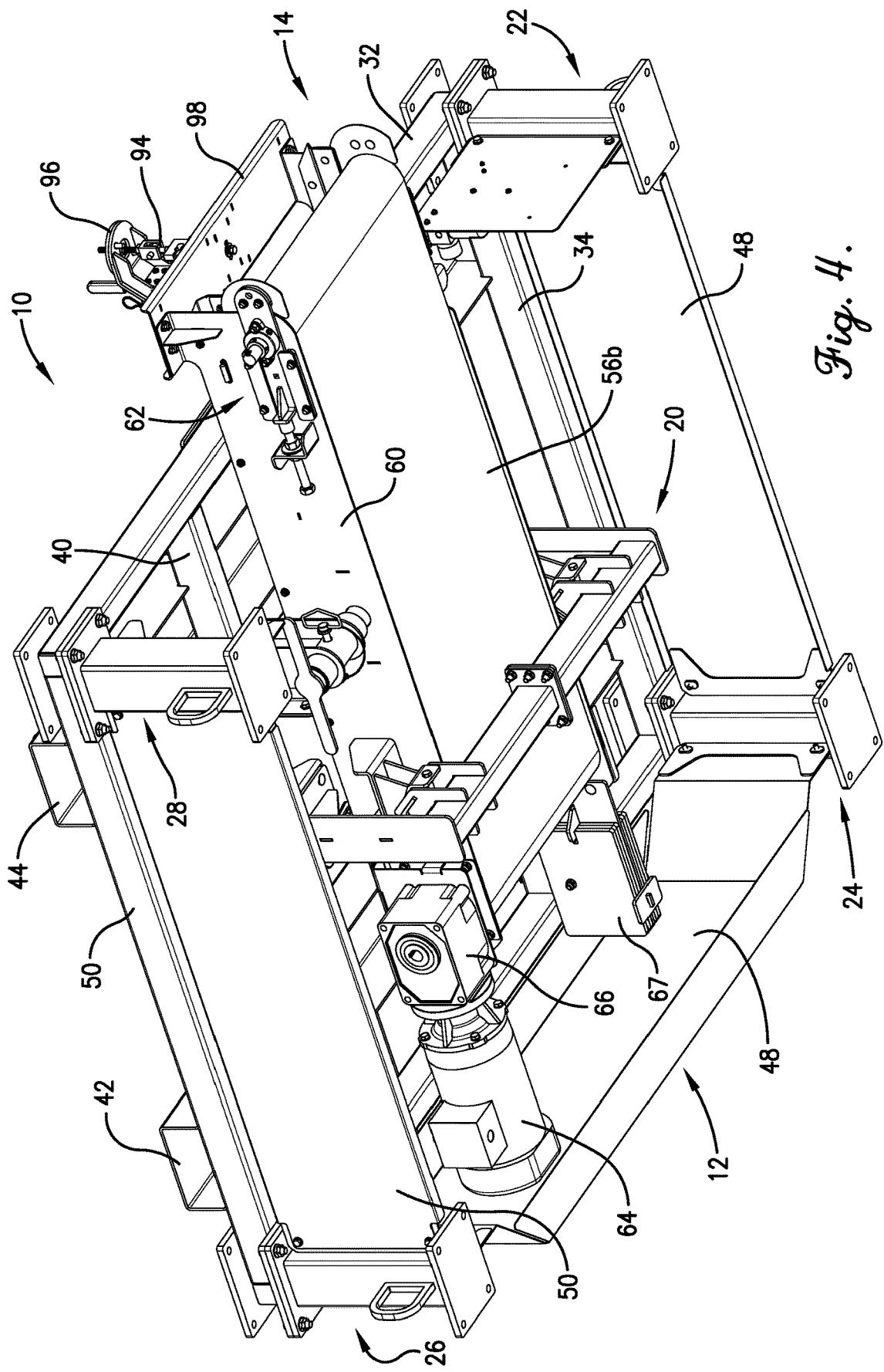
FIG. 4 is another bottom perspective view of the weigh belt assembly of FIGS. 1-3.

The weigh belt 14 is mounted within the frame 12, and includes inlet end and outlet end rollers 52, 54 with an endless belt 56 trained around the rollers 52, 54 to present corresponding upper and lower belt runs 56a and 56b. The rollers 52, 54 are supported by means of side plates 58 and 60 equipped with conventional belt-tensioning apparatus 62. The rollers 52, 54 also define corresponding substantially horizontal (plus-or-minus ("±") ten degrees(10°) from horizontal) axes of rotation 52a and 54a. According to certain aspects of the present invention, the weigh belt may be provided with additional rollers spaced between the rollers 52, 54 or additional rollers laterally outside the first roller. A belt drive preferably includes an electric belt drive motor 64 supported on the side plate 60 (inside the sidewall 48) by a right-angle gear box 66 (FIG. 4). The motor 64 and gear box 66 serve to shift the belt 56 during operation of assembly 10. More particularly, the illustrated motor 64 is drivingly coupled to the first roller 52 by the gear box 66, such that rotation of the first roller 52 imparts motion to the belt 56 and in turn the second roller 54. In even more detail, during operation, the upper run 56a (or whichever run on which the material is deposited) moves away from the first roller 52 such that the second roller 54 defines the outlet of the weigh belt 14. Alternative drives and drive arrangements are encompassed by certain aspects of the present invention. For example, according to some aspects of the present invention, the drive may be drivingly coupled to both rollers, an alternative motor or power source may be used, a direct drive motor (without a gear box) may be used, etc. As illustrated, a counterweight 67 is secured to plate 58.

Figure 2:
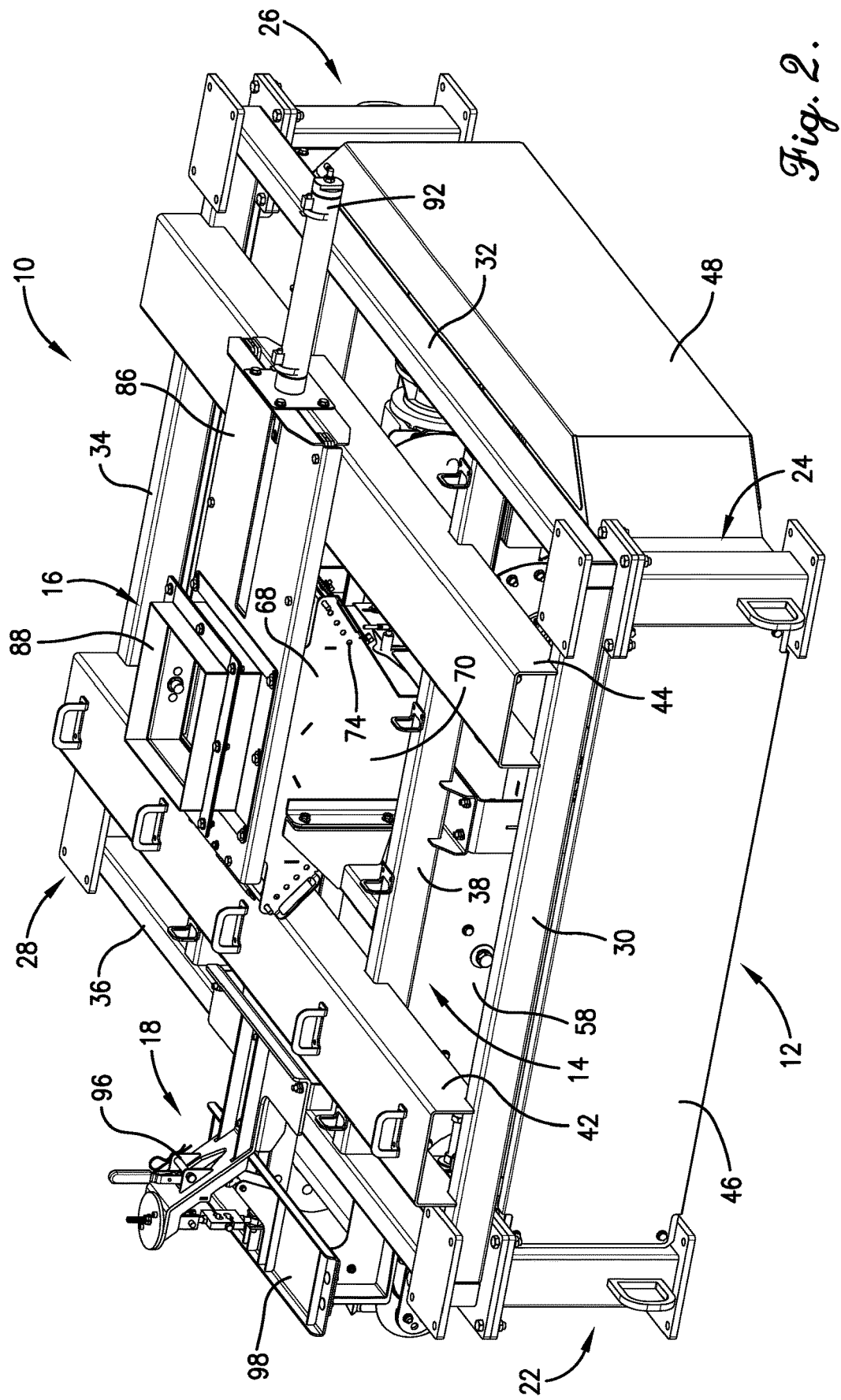
FIG. 2 is another top perspective view of the weigh belt assembly of claim 1, with certain parts broken away to better illustrate the structure of the weigh belt assembly.
Figure 5:
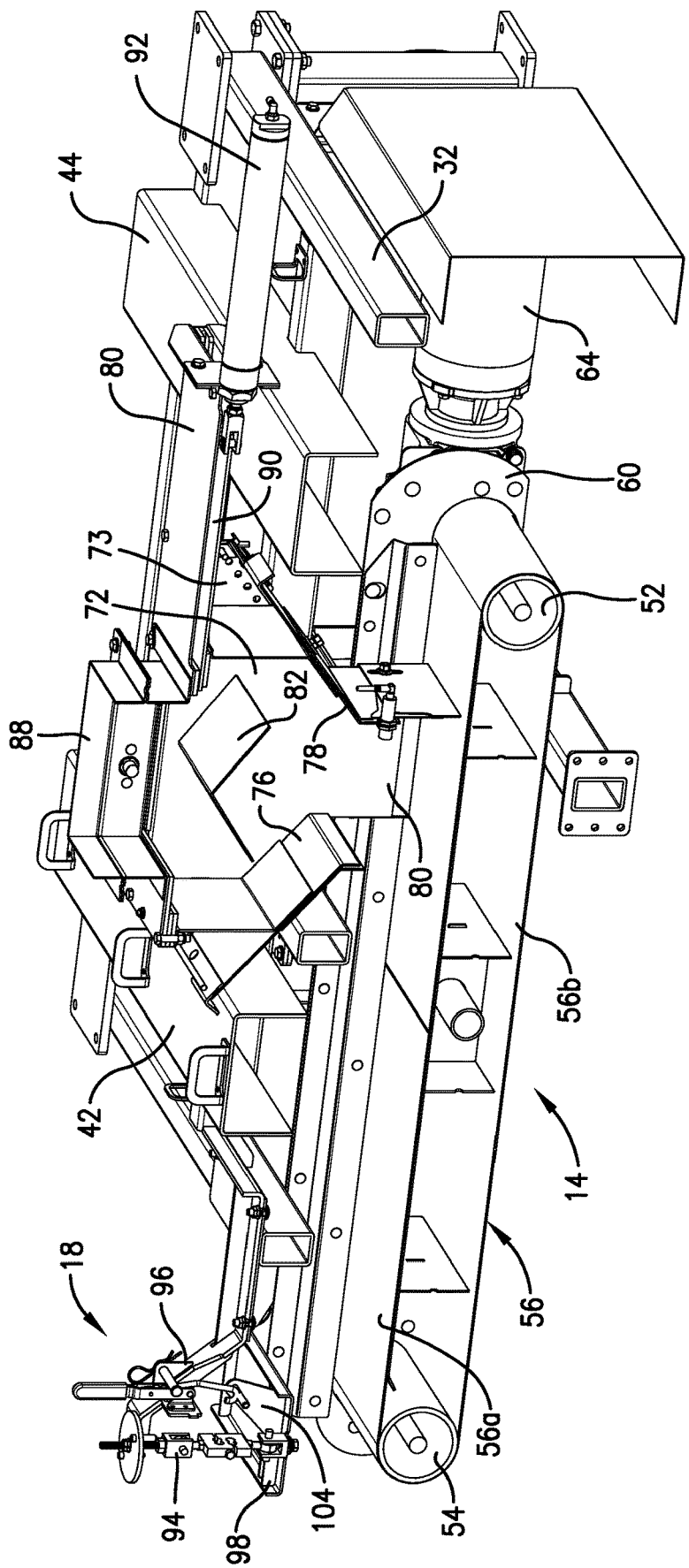
FIG. 5 is a perspective central sectional view of the weigh belt assembly.
Figure 6:
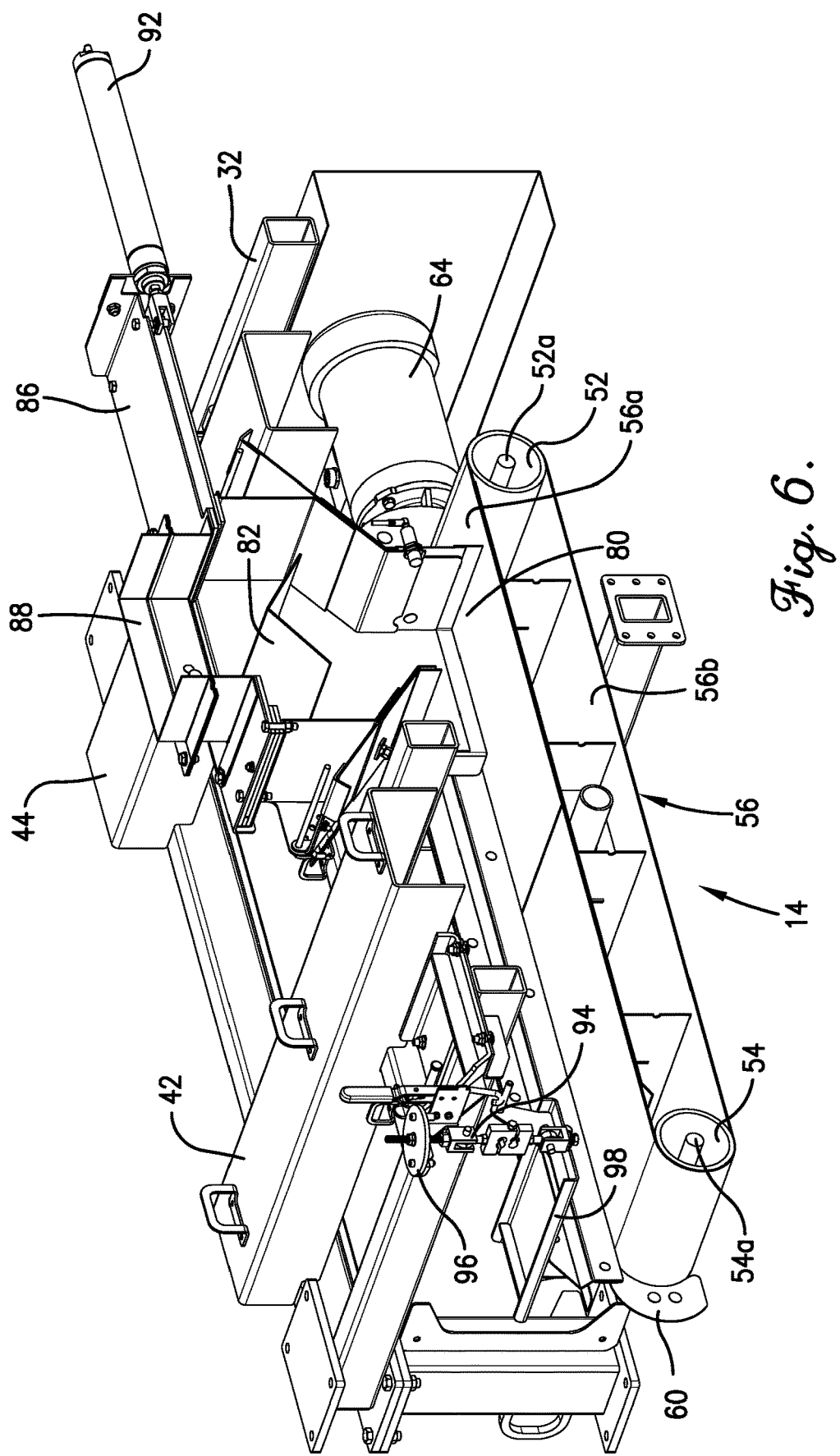
FIG. 6 is another perspective central sectional view of the weigh belt assembly.
Figure 7:
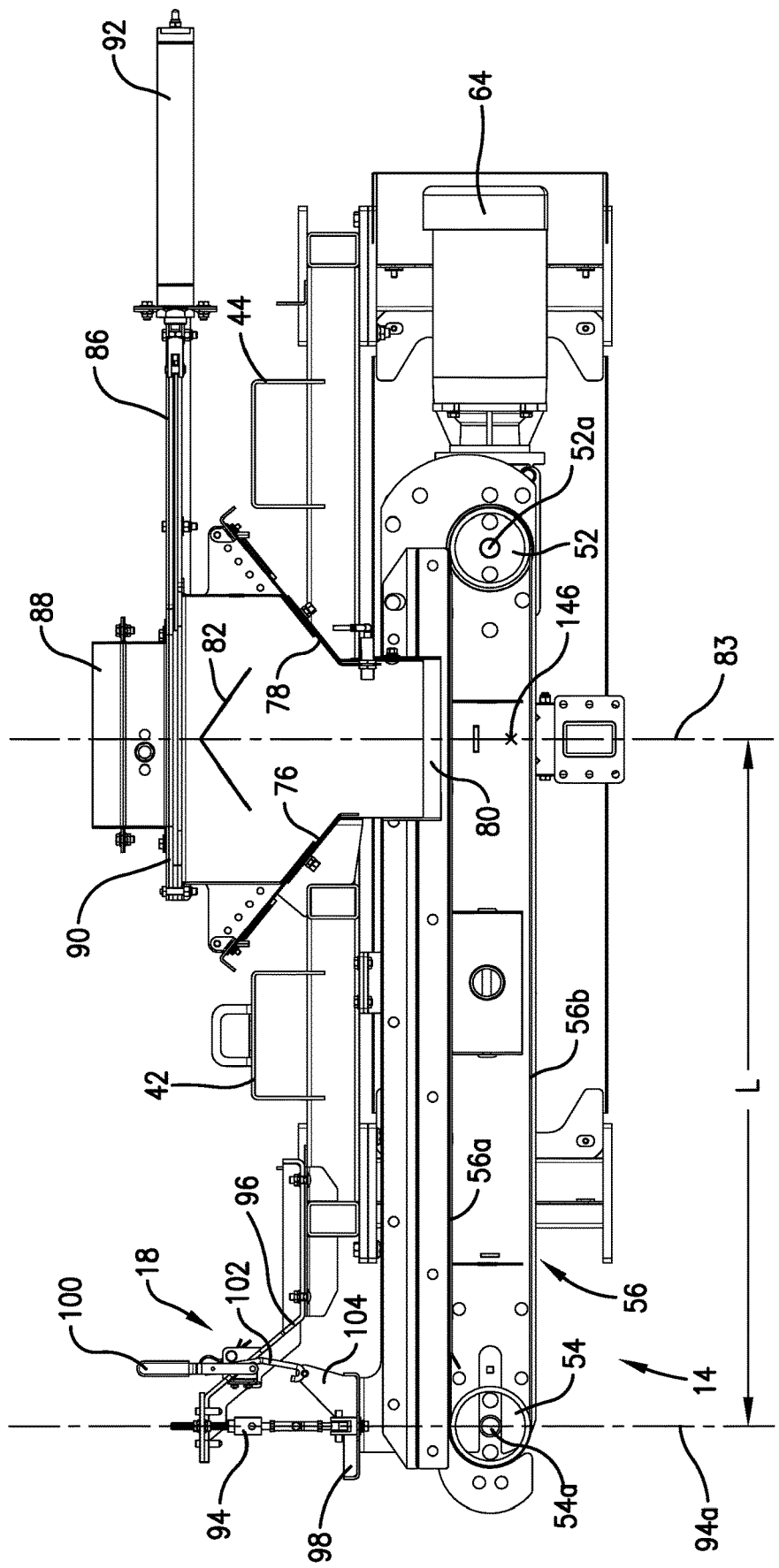
FIG. 7 is a side central sectional view of the weigh belt assembly.

The inlet unit 16 is positioned above the weigh belt 14 in a strategically significant manner discussed below. However, the unit 16 includes a chute 68 defined by stationary, upstanding opposed walls 70, 72 secured to the intermediate rails 38 and 40 having a series of adjustment openings 74 therein. Oblique interconnecting walls 76 and 78 (FIG. 5) extend between and are secured to the walls 70, 72. Each of the walls 76 and 78 is shiftable using a fastener 73 selectively received in one of a series of adjustment openings 74 (FIGS. 2 and 5) so as to change the location of the walls 76 and 78, thereby changing the effective open delivery area 80 of the chute 68. A stationary diverter 82 of inverted, V-shaped configuration is secured to the walls 70, 72, and is located above the delivery opening 80. As illustrated in FIG. 7, the chute 68 presents an upright product-delivery axis 83, which represents the average flow of material through the opening 80.

The unit 16 also includes a particulate supply controller 84 comprising a slide mount 86 secured to the upper end of chute 68 with an upstanding particulate entryway 88 in registry with the chute. The slide mount houses a fore-and-aft extending gate 90, which is controlled by a piston-and-cylinder assembly 92. Hence, the gate 90 may be moved between a fully closed position blocking the chute 68, or to a fully open position (shown in FIG. 5); if desired, the gate 90 may also be moved to any one of a number of intermediate positions. The fully open/fully closed operation of gate 90 assures that the weigh belt assembly 10 operates in a condition fully loaded with particulate materials, which provides the best results.

In accordance with certain aspects of the present invention, an alternative apparatus for delivering quantities of particulate material to the belt 14 may be provided. For example, certain principles of the present invention contemplate the use of alternative chute designs (having different shapes, being fixed so as not to be adjustable, etc.), no chute at all, alternative inflow controls (having a different gate design, a different gate controller, a metering assembly (such as rotating metering wheel), etc.), or no inflow control at all.

The weighing mechanism or device 18 preferably includes a load cell 94 which is positioned directly above the roller 56, and is supported in a cantilever fashion by a bracket assembly 96 secured to stationary rail 36 to present an essentially vertical weigh axis 94a (FIG. 7). Certain aspects of the present invention contemplate the use of alternative means for determining the particulate weight. For example, according to some principles of the present invention a balance may be provided, although the balance would most preferably present the same vertical weigh axis as load cell 94. Furthermore, certain aspects of the present invention encompass entirely other forms for determining the weight (which may not even have a vertical weigh axis), such as a strain gage coupled relative to the weight belt in a suitable manner. Returning to the illustrated embodiment, a laterally extending tray 98 is positioned adjacent the lower end of the load cell 94 and is secured to the side plates 58, 60; the lower end of the cell 94 is secured to the center of tray 98. As best seen in FIG. 7, a shiftable release handle 100 is provided on the bracket 96, having a link 102 secured to the tray 98 via an upstanding gusset 104. Rotation of the handle 100 causes the link 102 to detach from the gusset 104, whereby the entire weight of the weigh belt 14 is borne by the load cell 94. Prior to operation of the assembly 10, the load cell 94 may be calibrated by placement of weights of known magnitude on the tray 98. After calibration, the weights are removed and the assembly 10 is ready for use.

Figure 3:
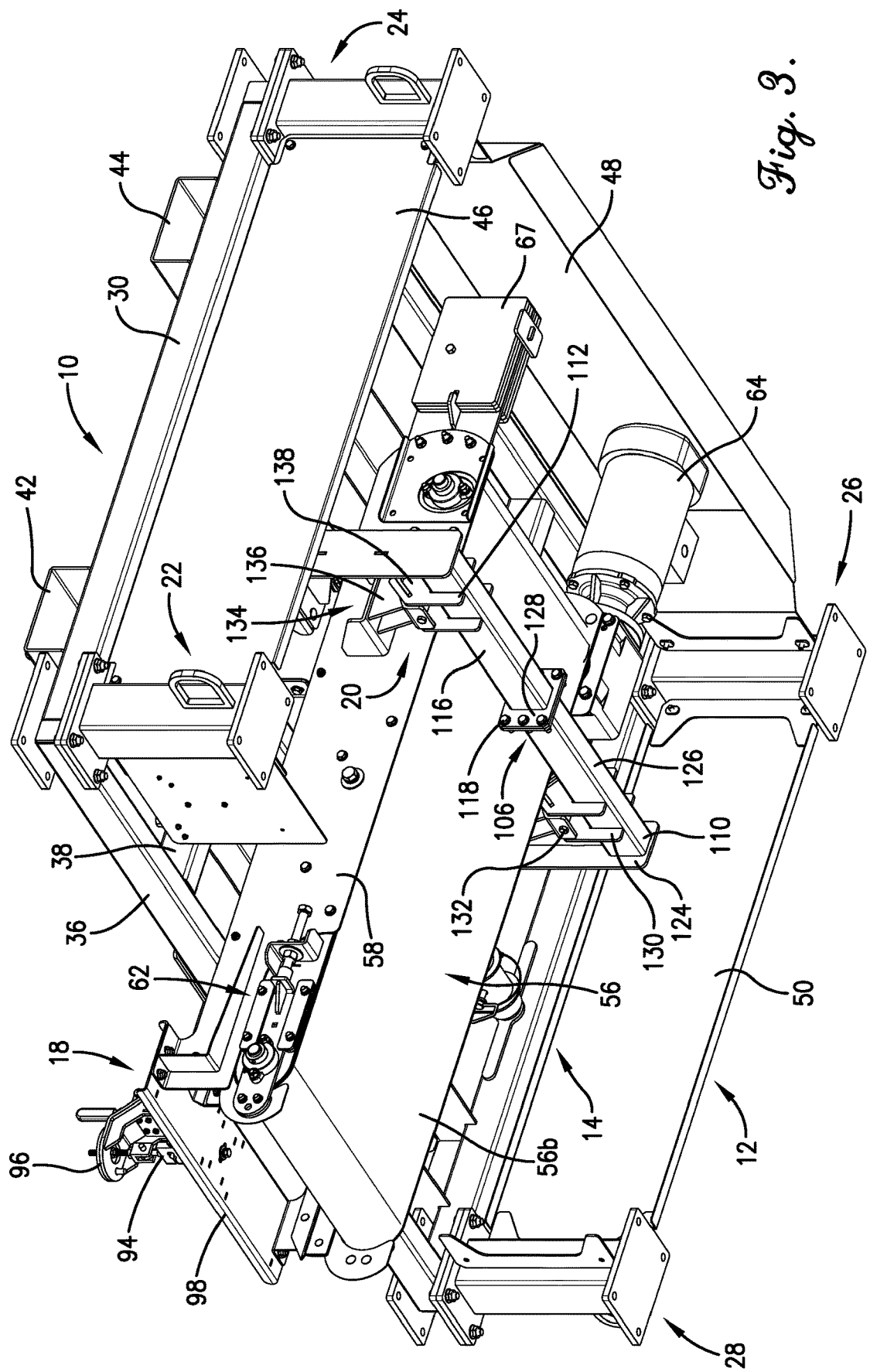
FIG. 3 is a bottom perspective view of the weigh belt assembly of FIGS. 1-2.

The pivot assembly 20 is designed to allow limited tilting deflection of the weigh belt 14 under a load of particulate material delivered from the chute 68 onto the upper run 56*a* of belt 56. The assembly 20 includes a stationary component 106 (FIG. 3) secured to stationary frame 12, and a corresponding pivotal component 108 (FIG. 9) secured to the weigh belt 14.

Figure 8:
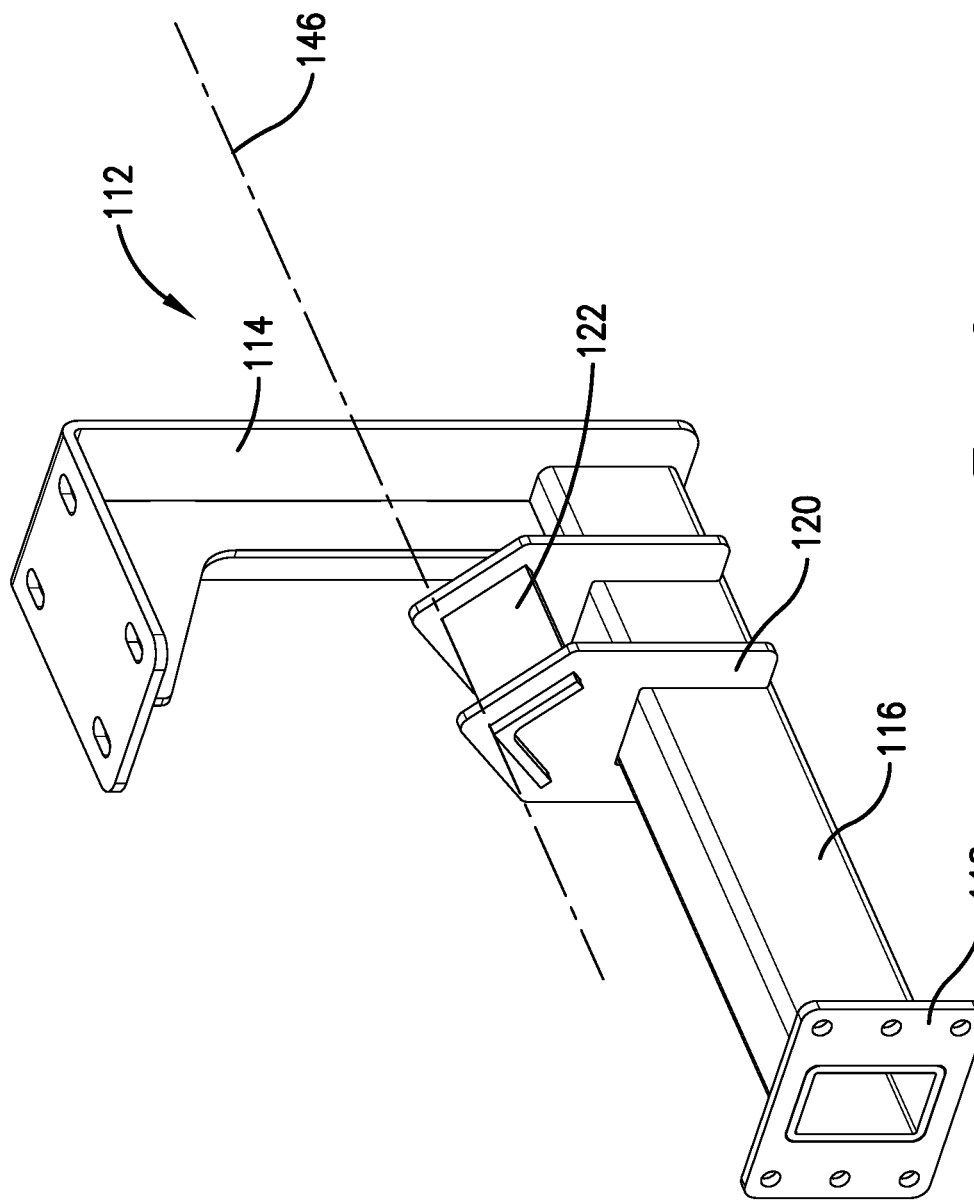
FIG. 8 is a perspective view of the stationary component of the pivot assembly of the weigh belt assembly.

The stationary component 106 is preferably made up of two generally L-shaped, rigid, mirror image, interconnected elements 110 and 112. FIG. 8 illustrates the element 112 including an upright connection leg 114 and a lowermost crosspiece 116 equipped with a connection pad 118 and a pivot support 120 having a support plate 122 of inverted, V-shaped configuration. The leg 114 is secured to the intermediate rail 38 with the crosspiece 116 extending beneath the lower run 56*b* of belt 56 (see FIGS. 3-4). In like manner, the element 110 has a connection leg 124, crosspiece 126, pad 128, and pivot support 130 with a support plate 132, with the leg 124 secured to the intermediate rail 36. The respective connection pads 118 and 128 are interconnected to provide a secure stationary component.

Figure 9:
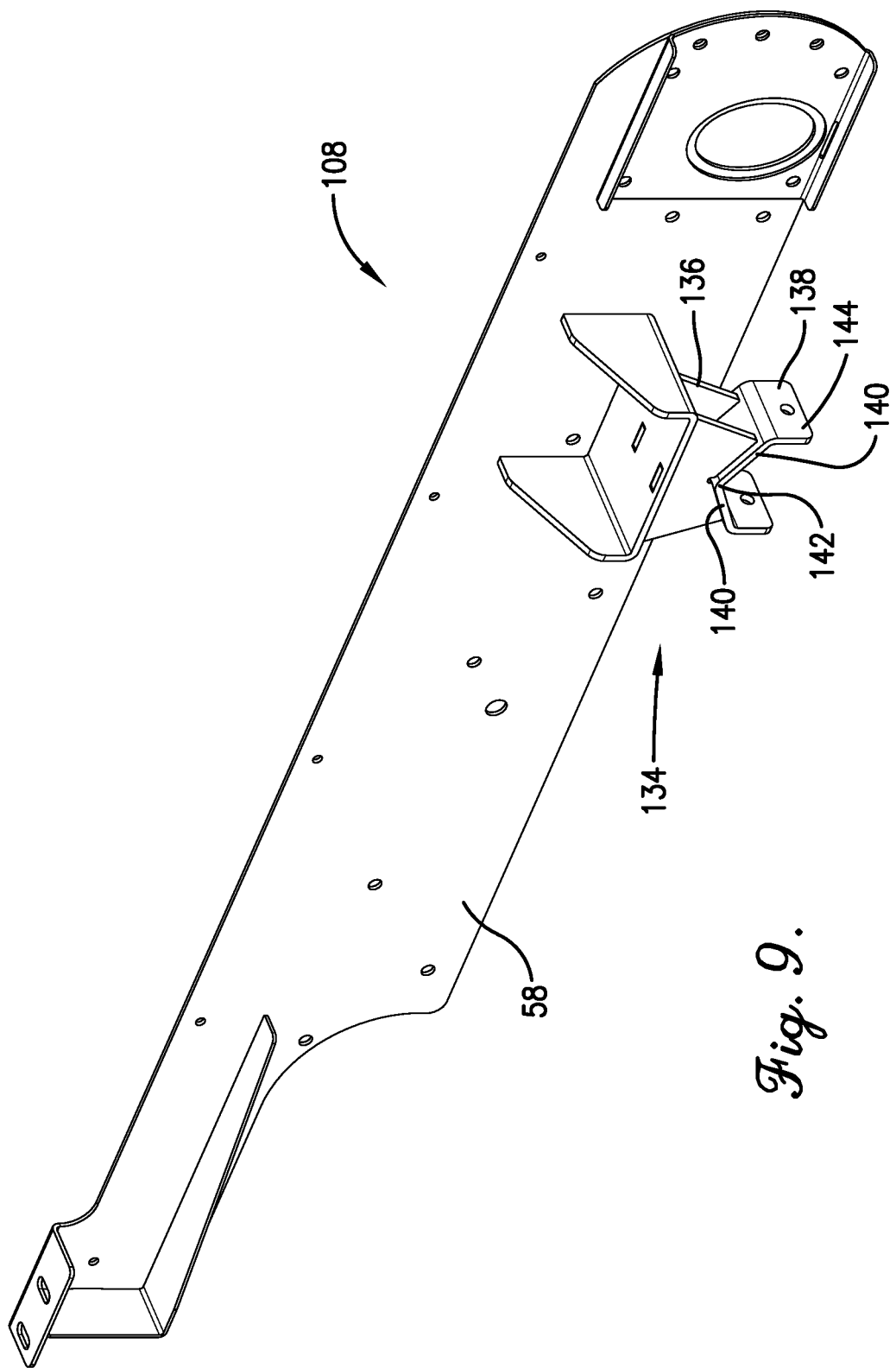
FIG. 9 is a perspective view of the shiftable component of the pivot assembly of the weigh belt assembly.

The pivotal component 108 preferably includes a pair of identical pivotal fixtures 134 respectively secured to the side plates 58 and 60 of weigh belt 14. One such fixture is illustrated in FIG. 9, and includes an upper bracket 136 affixed to the outer surface of side plate 58 and supporting a pivoting part 138 having a pair of oblique segments 140 defining an apex 142, and with depending side sections 144. As will be appreciated from a consideration of FIG. 3, the pivoting part 138 of each fixture 134 is positioned on a corresponding support plate 122. In this manner, the weigh belt 14 may pivot or deflect to a limited extent when a load of particulate is deposited on belt run 56*a*, about an elongated, laterally extending pivot axis 146 cooperatively defined by the mating rigid and pivotal components 106, 108 (see FIGS. 7 and 8). The pivot axis 146 is preferably substantially horizontal (±ten degrees(10°) from horizontal).

As mentioned previously, certain geometrical considerations should be borne in mind in the manufacture and assembly of the weigh belt assembly 10. These include the relative locations of the product-delivery axis 83 and pivot axis 146, the location of weigh axis 94*a* relative to the roller axis 54*a*, and the length L between the product-delivery and weigh axes 83 and 94 (FIG. 7).

Advantageously, the product-delivery axis 83 substantially intersects the pivot axis 146, as best seen in FIG. 7. While exact geometrical intersection is desirable, such may not be possible owing to tolerances or other manufacturing issues. Accordingly, as used herein, "substantially intersects" means that the product-delivery axis 83 is located ±five percent (5%) (more preferably ±two percent (2%)) from precise intersection with pivot axis 146, based upon the total length L between the product-delivery axis 83 and the weigh axis 94 taken as one hundred percent (100%). In like manner, the weigh axis 94*a* should exactly intersect rotational axis 54*a*. More generally, however, the weigh axis 94*a* should substantially intersect the rotational axis 54*a*, and in this context, "substantially intersect" means that the axis 94*a* should be located ±five percent (5%) (more preferably ±two percent (2%)) from the rotational axis 54*a*, based upon the total length L taken as one hundred percent (100%).

The operation of assembly 10 is controlled by means of one or more essentially conventional digital controllers. These controllers serve to initiate operation of the motor 64 to move the belt 56 at a specified linear speed, with simultaneous operation of the piston-and-cylinder assembly 92, so that product is delivered through entryway 88 and along the axis 83 for deposit on the upper run 56*a* of belt 56. These controllers determine both the flow rate of materials through the assembly 10, and also the total weight of particulate materials delivered by the assembly 10 over time by means of, inter alia, data from the load cell 94. The latter reading is detected by virtue of the relatively slight (usually on the order of a few millimeters) downward deflection of the weigh belt 14 under the load of particulate materials delivered from chute 68. Using this information, the controllers provide a read-out for the quantity of particulates delivered per unit time by the assembly 10, and the total weight of material delivered. For example, the belt speed is calculated based on the speed of motor 64, gear box reduction, drive pulley diameter, and other factors. The weight on the belt 56 is ascertained by multiplying the detected weight times two (2), because the assembly 10 weighs only one end of the belt. The relevant belt length is the length L between the axes 83 and 94*a*, and this length is known. Thus, considering a situation where the detected weight on the belt is fifty pounds (50 lbs), the length L of the belt is four feet (4 ft), and belt speed is one hundred feet per minute (100 ft/minute), the final result is calculated as (50×2)/4× 100=2500 lbs per minute flow rate of particulate. The controllers also totalize the flow rate to determine the total weight of material delivered.

The present invention provides a number of significant advantages over conventional weighing apparatus. First, there is but a single calibration using a greater percentage of the load cell weight range resulting in less hardware weight on the load cell in comparison to designs where the entire belt is weighed. Also, the present assembly 10 has a simplified mechanical design and is less sensitive to environmental disturbances. Belt tension does not alter the weight or calibration of the assembly 10 as compared with prior weigh bridge or weigh roller designs.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

Although the above description presents features of preferred embodiments of the present invention, other preferred embodiments may also be created in keeping with the principles of the invention. Furthermore, as noted previously, these other preferred embodiments may in some instances be realized through a combination of features compatible for use together despite having been presented independently as part of separate embodiments in the above description.

The inventor hereby states his intent to rely on the Doctrine of Equivalents to determine and access the reasonably fair scope of the present invention as pertains to any apparatus not materially departing from but outside the literal scope of the invention set forth in the following claims.

I claim:

1. A weigh belt assembly comprising:
a weigh belt including first and second spaced apart rollers each having a rotational axis, with an endless belt trained around the rollers to present a belt run configured to support particulate material;
a belt drive operably coupled with at least one of the rollers for rotation thereof in order to move said belt run in a direction toward the second roller;
apparatus for delivery of quantities of particulate material onto said moving belt run at a position between said first and second rollers;
a pivot assembly including a shiftable component operably coupled with said weigh belt in order to permit pivoting and downward deflection of the weigh belt under the load of the particulate material deposited on the belt run; and
a device for measuring the load experienced by said weigh belt during said deflection thereof,
said device presenting a weigh axis which substantially intersects the rotational axis of said second roller,
said apparatus comprising a chute located above said belt, said shiftable component located below the chute,
said chute presenting an upright product-delivery axis, said shiftable component presenting a weigh belt pivot axis, said product-delivery axis substantially intersecting said pivot axis.

2. The weigh belt assembly of claim 1, said device comprising a load cell proximal to said second roller.

3. The weigh belt assembly of claim 2, said device including a calibration tray operably coupled between the load cell and the weigh belt.

4. The weigh belt assembly of claim 1, said belt drive including a drive motor drivingly coupled to the first roller.

5. A weigh belt assembly comprising:
a weigh belt including first and second spaced apart rollers each having a rotational axis, with an endless belt trained around the rollers to present a belt run configured to support particulate material;
a belt drive operably coupled with at least one of the rollers for rotation thereof in order to move said belt run in a direction toward the second roller;
apparatus for delivery of quantities of particulate material onto said moving belt run at a position between said first and second rollers;
a pivot assembly including a shiftable component operably coupled with said weigh belt in order to permit pivoting and downward deflection of the weigh belt under the load of the particulate material deposited on the belt run; and
a device for measuring the load experienced by said weigh belt during said deflection thereof,
said device presenting a weigh axis which substantially intersects the rotational axis of said second roller,
said pivot assembly including a stationary component separate from said weigh belt, said shiftable component engaging said stationary component in order to permit said deflection of the weigh belt relative to said stationary component.

6. The weigh belt assembly of claim 5, said apparatus comprising a chute located above said belt, said shiftable component located below the chute.

7. The weigh belt assembly of claim 5, said device including a link operable to releasably secure the weigh belt relative to the stationary component and thereby selectively prevent said deflection.

8. A weigh belt assembly comprising:
a weigh belt including first and second spaced apart rollers each having a rotational axis, with an endless belt trained around the rollers to present a belt run configured to support particulate material;
a belt drive operably coupled with at least one of the rollers for rotation thereof in order to move said belt run in a direction toward the second roller;
apparatus for delivery of quantities of particulate material onto said moving belt run at a position between said first and second rollers;
a pivot assembly including a stationary component and a shiftable component, said stationary component separate from said weigh belt, said shiftable component operably coupled with said weigh belt and engaging said stationary component in order to permit pivoting and downward deflection of the weigh belt relative to said stationary component under the load of the particulate material deposited on the belt run; and
a device for measuring the load experienced by said weigh belt during said deflection thereof,
said apparatus comprising a chute located above said belt, said shiftable component located below the chute,
said chute presenting an upright product-delivery axis, said shiftable component presenting a weigh belt pivot axis, said product-delivery axis substantially intersecting said pivot axis.

9. The weigh belt assembly of claim 8, said device comprising a load cell proximal to said second roller and presenting a weigh axis which substantially intersects the rotational axis of said second roller.

10. The weight belt assembly of claim 9, said device including a calibration tray operably coupled between the load cell and the weigh belt.

11. The weigh belt assembly of claim 8, said belt drive including a drive motor drivingly coupled to the first roller.

12. A weigh belt assembly comprising:
a weigh belt including first and second spaced apart rollers each having a rotational axis, with an endless belt trained around the rollers to present a belt run configured to support particulate material;
a belt drive operably coupled with at least one of the rollers for rotation thereof in order to move said belt run in a direction toward the second roller;
apparatus for delivery of quantities of particulate material onto said moving belt run at a position between said first and second rollers;
a pivot assembly including a stationary component and a shiftable component, said stationary component separate from said weigh belt, said shiftable component operably coupled with said weigh belt and engaging said stationary component in order to permit pivoting and downward deflection of the weigh belt relative to said stationary component under the load of the particulate material deposited on the belt run; and
a device for measuring the load experienced by said weigh belt during said deflection thereof, said device including a link operable to releasably secure the weigh belt relative to the stationary component and thereby selectively prevent said deflection.

13. The weigh belt assembly of claim 12, said apparatus comprising a chute located above said belt, said shiftable component located below the chute.

14. The weigh belt assembly of claim 5, said device comprising a load cell proximal to said second roller.

15. The weigh belt assembly of claim 14, said device including a calibration tray operably coupled between the load cell and the weigh belt.

16. The weigh belt assembly of claim 12, said device comprising a load cell proximal to said second roller and presenting a weigh axis which substantially intersects the rotational axis of said second roller.

17. The weigh belt assembly of claim 16, said device including a calibration tray operably coupled between the load cell and the weigh belt. using a load cell.

18. The weigh belt assembly of claim 5, said belt drive including a drive motor drivingly coupled to the first roller.

19. The weigh belt assembly of claim 12, said belt drive including a drive motor drivingly coupled to the first roller.

\* \* \* \* \*